(12) United States Patent
Johnson et al.

(10) Patent No.: US 7,184,722 B1
(45) Date of Patent: Feb. 27, 2007

(54) MAINTAINING CONSTANT POWER OVER A WIDE RANGE OF TEMPERATURES EMPLOYING A POWER AMPLIFIER WITH ADJUSTABLE CURRENT DRAIN

(75) Inventors: Gerald B. Johnson, Hudson, OH (US); James Friedmann, Canton, OH (US)

(73) Assignee: Cisco Technology, Inc., San Jose, CA (US)

( * ) Notice: Subject to any disclaimer, the term of this patent is extended or adjusted under 35 U.S.C. 154(b) by 526 days.

(21) Appl. No.: 10/724,796

(22) Filed: Dec. 1, 2003

Related U.S. Application Data

(63) Continuation of application No. 09/750,818, filed on Dec. 28, 2000, now Pat. No. 6,661,999.

(51) Int. Cl.
*H04B 1/04* (2006.01)

(52) U.S. Cl. .............. 455/127.1; 455/127.2; 455/522; 455/574; 455/343.1; 375/146

(58) Field of Classification Search .............. 455/126, 455/127.1, 127.2, 127.3, 522, 3.01, 561, 455/572, 574, 343.1, 324, 127.5, 69; 370/277, 370/342; 375/130, 146
See application file for complete search history.

(56) References Cited

U.S. PATENT DOCUMENTS

| | | | | |
|---|---|---|---|---|
| 5,136,612 | A * | 8/1992 | Bi .............................. | 370/342 |
| 6,084,473 | A * | 7/2000 | Nauta et al. ................ | 330/254 |
| 6,272,125 | B1 * | 8/2001 | Nomura ..................... | 375/146 |
| 6,362,690 | B1 * | 3/2002 | Tichauer .................... | 455/126 |
| 6,377,782 | B1 * | 4/2002 | Bishop et al. ............. | 455/3.01 |
| 6,526,266 | B1 * | 2/2003 | Obara ........................ | 455/126 |
| 6,567,478 | B2 * | 5/2003 | Oishi et al. ................ | 375/297 |

OTHER PUBLICATIONS

HFA3861B—Schematic Diagram—Typical Transceiver Application circuit Using the HFA3861B.
HFA3861B, Intersil Data Sheet, "Direct Sequence Spread Spectrum Baseband Processor", Jan. 2000, File No. 4816.
HFA3783, Intersil Data Sheet, "IIQ Modulator/Demodulator and Synthesizer," Nov. 2000, File No. 4633.3.
HFA3683A, Intersil Data Sheet, "2.4GHz RFIIF Converter and Synthesizer," Sep. 2000, File No. 4634.3.
HFA3983, Intersil Data Sheet, "2.4GHz Power Amplifier and Detector," Mar. 2000, File No. 4634.4.
Harris Semiconductor, HFA3726, "400MHz Quadrature IF Modulator/Demodulator," Jun. 1997.
Harris Semiconductor, HFA3925, "2.4GHz—2.5GHz 250mW Power Amplifier," Mar. 1996.

(Continued)

*Primary Examiner*—Quochien B. Vuong
(74) *Attorney, Agent, or Firm*—Tucker, Ellis, & West LLP

(57) ABSTRACT

A system and method for transmitting data communications through air using a radio. The invention allows the user to select from a number of predetermined output transmission powers. When a lower output transmission power is selected the current drain to the associated amplifier is decreased thereby conserving battery power of the radio. In addition, a detector diode circuit combined with an adjustable gain amplifier combine to provide a feedback mechanism whereby the output transmission power of the radio is held substantially constant over a broad range of temperatures.

18 Claims, 10 Drawing Sheets

OTHER PUBLICATIONS

Harris Semiconductor, HFA3424, "2.4GHz—2.5GHz Low Noise Amplifier," Mar. 1996.

Harris Semiconductor, HFA3524, "2.5GHz/600MHz Dual Frequency Synthesizer," Mar. 1996.

Harris Semiconductor, HFA3627, 2.4GHz RF to IF Converter, Mar. 1996.

HFA3860A—Schematic Diagram, Typical Transceiver Application circuit Using the HFA3860A.

* cited by examiner

MAINTAINING CONSTANT POWER OVER A WIDE RANGE OF TEMPERATURES EMPLOYING A POWER AMPLIFIER WITH ADJUSTABLE CURRENT DRAIN

RELATED APPLICATION

This application is a Continuation Application of application Ser. No. 09/750,818, filed Dec. 28, 2000 now U.S. Pat. No. 6,661,999.

FIELD OF INVENTION

The present invention relates generally to a power amplifier circuit for use in radios directed towards the transmission of wireless data communications. The invention is directed to the wireless local area network environment. More particularly, the present invention is directed towards a system for selectably increasing the transmission power of radios used in wireless computer networks over a broad range of temperatures and reducing the current drain as the transmit power of the radio is decreased so as to extend the battery life of such a device.

BACKGROUND OF THE INVENTION

The use of wireless networks has increased dramatically over the past few years. Wireless local area networks ("WLANs") are now commonplace in the small office/home office ("SOHO") environment as well as the commercial building to commercial building environment. A WLAN offers several advantages over regular wired local area networks ("LANs"). For example, users are not confined to specified locations previously wired for network access, wireless work stations are relatively easy to link with an existing LAN without the expense of additional cabling or technical support; and WLANs provide excellent alternatives for mobile or temporary working environments.

In general there are two types of WLANs, independent and infrastructure WLANs. The independent, or peer-to-peer, WLAN is the simplest configuration and connects a set of personal computers with wireless adapters. Any time two or more wireless adapters are within range of each other, they can set up an independent network. In infrastructure WLANs, multiple base stations link the WLAN to the wired network and allow users to efficiently share network resources. The base stations not only provide communication with the wired network, but also mediate wireless network traffic in the immediate neighborhood. Both of these network types are discussed extensively in the IEEE 802.11 standard for WLANs.

In the majority of applications, WLANs are of the infrastructure type. That is, the WLAN typically includes a number of fixed base stations, also known as access points, interconnected by a cable medium to form a hardwired network. The hardwired network is often referred to as a system backbone and may include many distinct types of nodes, such as, host computers, mass storage media, and communications ports. Also included in the typical WLAN are intermediate base stations which are not directly connected to the hardwired network.

These intermediate base stations, often referred to as wireless base stations, increase the area within which base stations connected to the hardwired network can communicate with mobile terminals. Associated with each base station is a geographical cell. A cell is a geographic area in which a base station has sufficient signal strength to transmit data to and receive data from a mobile terminal with an acceptable error rate. Unless otherwise indicated, the term base station will hereinafter refer to both base stations hardwired to the network and wireless base stations. Typically, the base station connects to the wired network from a fixed location using standard Ethernet cable, although in some case the base station may function as a repeater and have no direct link to the cable medium. Minimally, the base station receives, buffers, and transmits data between the WLAN and the wired network infrastructure. A single base station can support a small group of users and can function within a predetermined range.

In general, end users access the WLAN through WLAN adapters, which are commonly implemented as PCMCIA cards in notebook computers, ISA or PCI cards in desktop computers, or fully integrated devices within hand-held computers. WLAN adapters provide an interface between the client network operating system and the airwaves. The nature of the wireless connection is transparent to the network operating system.

In general operation, when a mobile terminal is powered up, it "associates" with a base station through which the mobile terminal can maintain wireless communication with the network. In order to associate, the mobile terminal must be within the cell range of the base station and the base station must likewise be situated within the effective range of the mobile terminal. Upon association, the mobile unit is effectively linked to the entire LAN via the base station. As the location of the mobile terminal changes, the base station with which the mobile terminal was originally associated may fall outside the range of the mobile terminal. Therefore, the mobile terminal may "de-associate" with the base station it was originally associated to and associate with another base station which is within its communication range. Accordingly, WLAN topologies must allow the cells for a given base station to overlap geographically with cells from other base stations to allow seamless transition from one base station to another. One example of this "association" process is described extensively in IEEE 802.11.

The radio component of WLAN adapters receive and transmit data via radio frequency ("RF") or infrared ("IR") media. Currently, it is common for manufacturers of WLAN devices to utilize integrated chip sets from third party developers. In the WLAN field, one such manufacturer is Intersil which manufactures and sells the PRISM I® and the PRISM II® chip set. The PRISM I® chip set is a first generation chip set which provided rudimentary functions to the WLAN developer. However, the PRISM I® chip set did not perform as well in a confined, multi-path environment as it performed outdoors in a single path environment. The PRISM II® chip set is a second generation chip set which is highly integrated. The PRISM II® chip set also has more signal processing capabilities for better performance in a multi-path environment. Since the PRISM II® chip set is highly integrated, the developer must abide by design trade-offs made by the manufacturer. One such design trade-off limits the transmit power of the radio and therefore limits the range of communication associated with devices incorporating the chip set.

While it is possible to increase the output power of the integrated chip set various problems arise that will affect the transmitted signal. Normally, this is observed in the transmit spectrum mask. FIG. 1 illustrates the mandated transmit spectrum mask associated with IEEE standard 802.11. As shown, a conforming device must a have transmit spectral mask of less than −30 dB at the channel center frequency ±11–22 MHz and −50 dB for the channel center frequency ±22–33 MHz. Generally, a problem arises when the developer attempts to increase the transmit power for the integrated chip set beyond that set by the manufacturer. Upon such increase in the transmit power, a device previously conforming to the transmit spectral mask no longer meets the requirements and becomes non-conforming, that is the signal does not achieve the mandated −30 dB decrease at ±11–22 MHz from channel center frequency or the −50 dB decrease from the channel center frequency at +22–33 MHz.

Another problem encountered with current wireless LAN chip sets is that they typically have a transmit power amplifier with a relatively low compression point and a fixed current bias setting. This results in limited transmit output power, in the Intersil PRISM II® chip set, the output transmit power is typically around 30 mW. In addition, while lower output power levels such as 15 mW and 1 mW are possible by decreasing the transmit gain of the I/Q modulator chip, the transmit power amplifier's current drain at the 15 mW and 1 mW output levels is the same as the current drain at the 30 mW output level. Thus, battery life may be extended by lowering the transmit current drain when operating at lower power levels.

The present invention addresses these and other problems encountered in the prior art, to provide a system for increased output transmitter power effective over a broad range of temperatures.

SUMMARY OF THE INVENTION

According to the present invention there is provided a system for increasing the transmit output power of a radio used in wireless data communications, thereby effectively increasing the communication range of such devices. The present invention also provides that the transmit current drain of the power amplifier may be lowered when the radio is operating at less than its maximum output range, thereby providing a means for conserving battery life of the radio. The system comprises: an apparatus for transmitting data communications through air using a radio comprising: a receive means adapted for receiving an associated data input signal; a modulating means adapted for modulating the associated data input signal; a spreading means for performing a direct sequence spread spectrum operation on the associated data input signal resulting in a spread data input signal; a converting means for converting the spread data input signal to a spread radio frequency data signal; an amplifier means for amplifying the spread radio frequency data signal with a first amplifier having an adjustable gain control; an amplifying means for amplifying the spread radio frequency data signal with a second amplifier having an adjustable bias current control for selecting a bias current for a desired transmission output power wherein selection of a lower transmission power results in a lower current drain; a detecting means for detecting a power signal created from at least a portion of the radio frequency data signal; a printed circuit board coupler that couples transmission power to a radio frequency detector diode circuit; a digital to analog converter for converting the at least a portion of the radio frequency data signal to an analog error signal; an amplifying means for amplifying the radio frequency data signal proportionately with the error signal by adjusting the gain control of the first amplifier to achieve a substantially constant output transmission power over a selected temperature range; and transmission means adapted for transmitting the radio frequency data signal through at least one associated antenna.

According to another aspect of the invention there is provided a method for increasing the transmit output power of a radio used in wireless data communications, thereby effectively increasing the communication range of such devices. The method comprises: receiving a data input signal; modulating the data input signal; performing a direct sequence spread spectrum operation on the data input signal resulting in a spread data input signal; converting the spread data input signal to a spread radio frequency data signal; amplifying the spread radio frequency data signal with a first amplifier having an adjustable gain control; selectively amplifying the radio frequency data signal with a second amplifier having an adjustable bias current control in accordance with a desired transmission output power, wherein selection of a lower transmission power results in a lower current usage by the second amplifier; selectively detecting a power signal from at least a portion of the radio frequency data signal and a printed circuit board coupler that couples transmission power to a radio frequency detector diode circuit; converting the at least a portion of the radio frequency data signal to an analog error signal by a digital to analog converter; amplifying the radio frequency data signal proportionately with the error signal by adjusting the gain control of the first amplifier to achieve a substantially constant output transmission power over a specified temperature range; transmitting the radio frequency data signal through by at least one antenna.

Another aspect of the invention is to maintain communications over a broad temperature range at a substantially constant output transmission power.

In another embodiment, the invention utilizes a digital feedback loop to adjust the output of the power amplifier to keep the output power constant over a typical temperature range.

In another embodiment, the invention may allow the user to select a predetermined transmit output power and lower the current drain when maximum output power is not required, thereby conserving battery life when a lower output power transmission is required.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and system and method of which will be described in detail in this specification and illustrated in the accompanying drawings which form a part hereof, and wherein.

DETAILED DESCRIPTION OF THE INVENTION

It should be appreciated that a preferred embodiment of the present invention as described herein makes particular reference to the IEEE 802.11 Standard, and utilizes terminology referenced therein. However, it should be understood that reference to the IEEE 802.11 standard and its respective terminology is not intended to limit the scope of the present invention. In this regard, the present invention is suitably applicable to a wide variety of other communication systems which utilize a plurality of operating frequencies for data transmission. Moreover, it should be appreciated that while the present invention has been described in connection with a wireless local area network (WLAN), the present invention is suitable for use in connection with other types of wireless networks, including a wireless wide area network (WWAN), a wireless metropolitan area network (WMAN) and a wireless personal area network (WPAN).

Figure 2:
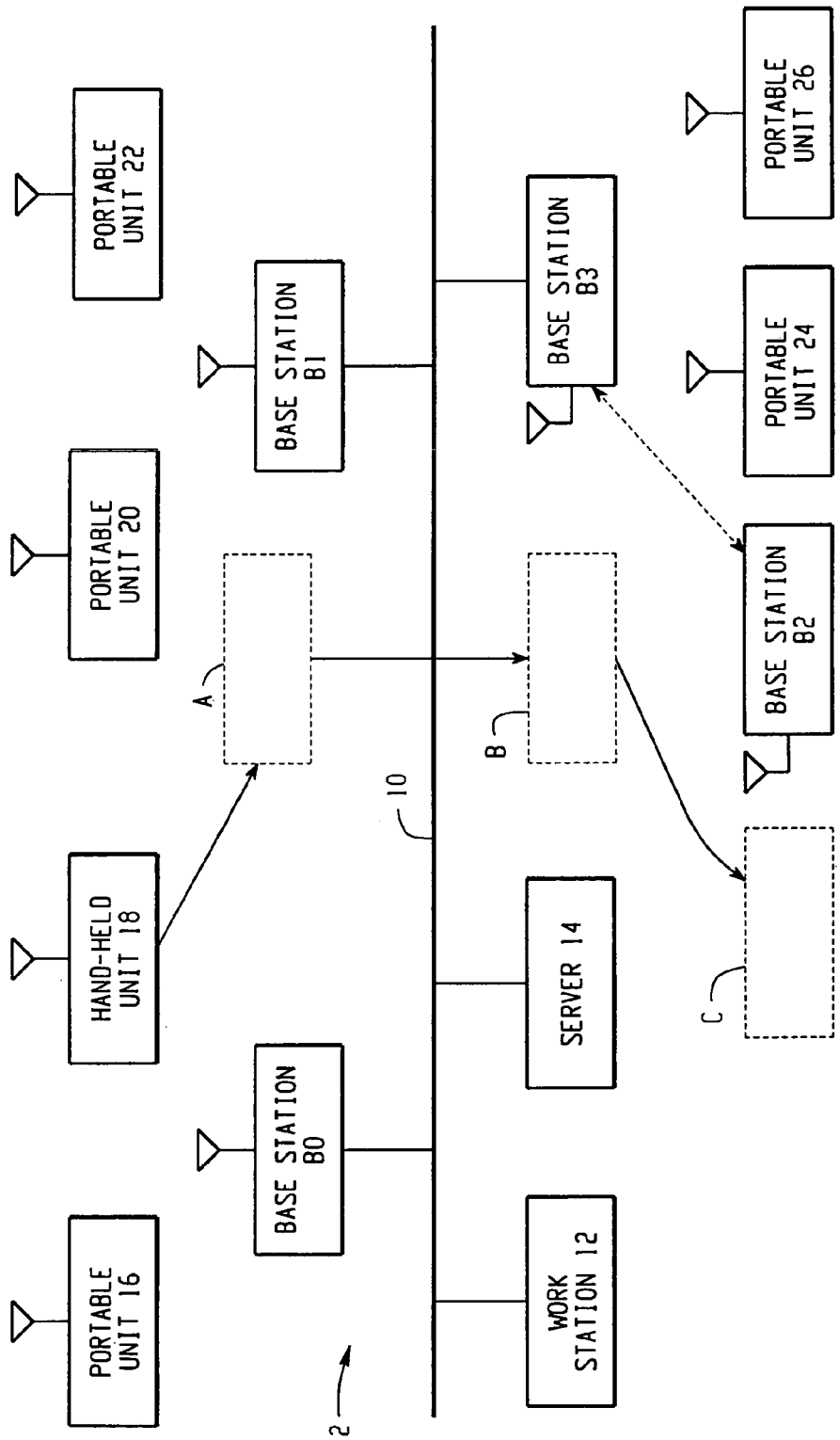
FIG. 2 is a schematic representation of a typical WLAN configuration.

Referring now to FIG. 2, there is shown a typical WLAN used with the present invention. More specifically, FIG. 2 shows a WLAN system 2 generally comprised of a plurality of communication devices including mobile stations (i.e., portable units 16, 20, 22, 24 and 26, and hand-held unit 18) and a plurality of base stations (also commonly referred to as access points or base stations) B0, B1, B2, and B3. The base stations may be connected to a hardwired network backbone or serve as wireless base stations. Each base station can transmit and receive data in its respective cell. WLAN system 2 also includes a cable medium, namely, an Ethernet cable 10, along which all network data packets are transmitted when conveyed between any two network nodes. The principal nodes are direct-wired to the cable 10. These include a work station 12 and a network server 14, but may include a mainframe computer, communication channels, shared printers and various mass storage.

In WLAN system 2, base station B2 effectively operates as a repeater, coupled to the cable 10 by the base station B3 and a radio link with the base station B3. Base station B2 has been termed a "base station" because it registers mobile stations in the same manner as the base stations that are direct-wired to the cable 10, and offers the same basic registration services to the mobile stations. The base station B2 and each device to which it offers packet transferring services will, however, be registered with the base station B3 to ensure that packets intended for or transmitted by devices associated with the base station B2 are properly directed through the base station B2.

Several LANs are present in the WLAN system 2. These LAN's are not specifically indicated, but each is effectively defined by the area which a single base station can serve, given limited transmission power, and the devices within that area. One LAN is served by the base station BO and currently contains a portable unit 16, such as a line-powered personal computer, and a battery-powered hand-held unit 18. A second LAN is served by another base station B1 and currently contains two portable units 20, 22. A third LAN is served by the other wired base station B3 and also contains two portable units 24, 26. A fourth LAN is served by the base station B2, and no network device is currently within the range of that base station. The cable 10 and its nodes are also treated effectively as a LAN. It should be noted that all transmission between devices in different LAN's is via the cable 10. Only transmissions between devices in a single LAN avoid using the cable 10, but such matters are not discussed extensively herein.

General operation of the network to accommodate movement of the hand-held unit 18 will now be described. The hand-held unit 18 is assumed to be registered initially with the base station B0. The base station B0 is also assumed to have undelivered packets addressed to the hand-held unit 18. The hand-held unit 18 is assumed then to move to position A, illustrated in phantom outline in FIG. 2, assumed to be beyond the transmission range of the base station B0. The hand-held unit 18 transmits polling packets at intervals, following its power-saving routine, with no response from the base station B0. After a predetermined number of attempts to poll the base station B0, the hand-held unit 18 causes transmission of a packet requesting registration with a network communication base station and providing its unique network address or identification. The registration-requesting packet is assumed in this instance to be received only by the base stations B1 and B3.

It is assumed that both base stations B1 and B3 can accommodate another device. Each then transmits a response packet addressed to the hand-held unit 18 and each reserves a registration slot for a predetermined period of time. Each response packet will include the base station's unique network address and will also indicate the number of hops from the base station to the cable 10. A base station connected directly to the cable 10 is regarded as 0 hops from the cable 10. A base station that functions as a repeater returns a positive number indicating the number of intervening base stations (hops) required to couple it to the cable 10.

The hand-held unit 18 then responds to the base station response packets by selecting one of the responding base stations B1, B3. The selection is made according to the number of hops to the cable 10, signal strength (detected in a conventional manner), and which response packet is first received, priority being assigned in that order. In the present case, governed by the second criterion, namely, signal strength, and assuming that the closer base station B1 produces a stronger received signal, the hand-held unit 18 selects the base station B1. The hand-held unit 18 then transmits a selection packet addressed to the base station B1 requesting registration. The selected base station B1 responds to the selection packet by registering the hand-held unit 18 and begins the process of monitoring the cable 10 for packets addressed to the hand-held unit 18. Base station B1 also recognizes and conveys to the cable 10 any data packets received from the hand-held unit 18. The base station B3, not selected, but within range, does not respond to packets in the cable 10 addressed to the hand-held unit 18 and does not respond to any data packets received from the hand-held unit 18. No duplicate packets are produced within the cable 10 and no duplicate packets are transmitted through air.

Contemporaneously with registration, the selected base station B1 transmits via the cable 10 a multicast packet indicating its registration of the hand-held unit 18. The multicast packet contains a unique address for each of the network base stations. The multicast packet is conveyed via the cable 10 to the base station B0 with which the hand-held unit 18 had been registered. The base station B0 responds by immediately de-registering the hand-held unit 18, discontinuing monitoring of the cable 10 for packets addressed to the hand-held unit 18 and disregarding further packets of a general nature transmitted by the hand-held unit 18 and possibly received by the base station B1. The base station B0 also responds by transmitting along the cable 10 any undelivered packets that are addressed to the hand-held unit 18.

The newly selected base station B1 retrieves the packets from the cable 10 and stores them for re-transmission to the hand-held unit 18.

The hand-held unit 18 may then move to position B shown in phantom in FIG. 2. It is assumed now to be out of range of the base station B1 but still within the range of base stations B3 and B2. After predetermined attempts to contact the base station B1 with polling packets, the hand-held unit 18 sends a packet requesting registration with a communication base station. It receives response packets only from the base stations B2, B3. The packet from base station B2 will indicate that the base station B2 is one hop away from the cable 10, that is, the base station functions as a repeater. The packet from the base station B3 indicates direct connection to the cable 10 (zero hops). The hand-held unit 18 consequently selects the base station B3 according to the criteria specified above, and transmits a packet requesting registration with the base station B3. The base station B3 responds with response packet confirming registration, assuming no intervening registrations have taken the full capacity of the base station B3. If the capacity of the base station were somehow taken, the hand-held unit 18 would repeat transmission of its selection packet, assume transmission failure, and re-initiate the process of locating an appropriate communication base station. The base station B3 also transmits via the cable 10 a multicast packet addressed to base stations indicating the registration, and the base station B1 de-registers the hand-held unit 18. The base station B1 transmits any undelivered packets addressed to the hand-held unit 18 along the cable 10, and the new base station B3 detects and stores the packets. In effect, the base station B3 is fully conditioned to continue packet transmission from where the last base station lost communication with the hand-held unit 18

Figure 1:
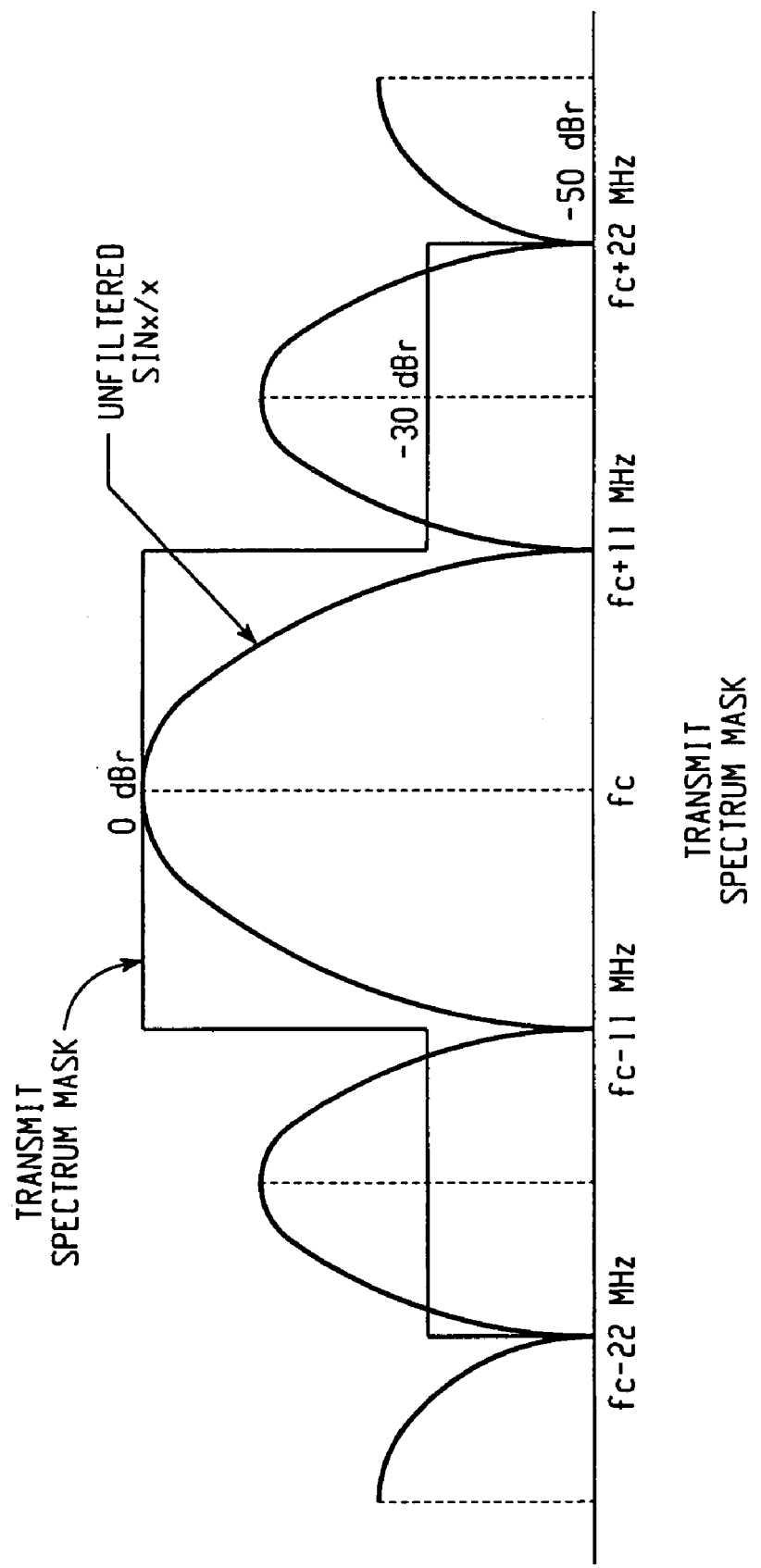
FIG. 1 is the transmit spectrum mask described in IEEE 802.11.

In position C illustrated in phantom in FIG. 1, the hand-held unit 18 is assumed to be out of range of all base stations except the base station B2. With repeated failure in transmission of packets to the base station B3, the hand-held unit 18 transmits a packet requesting registration with a base station. Only the base station B2 responds by transmitting an appropriate packet. The selection process at the hand-held unit 18 is simplified, the only criterion to be applied is that a base station responded and was effectively the first base station to respond. The hand-held unit 18 then transmits its selection packet identifying the base station B2 and requesting registration. The base station B2 registers the hand-held unit 18, and transmits a multicast packet via the cable 10 addressed to base stations confirming the registration. The base station B3 actually places the packet on the cable 10.

General operation of the representative WLAN network 2, as discussed above, is known to those skilled in the art, and is more fully discussed in U.S. Pat. No. 5,276,680, which is fully incorporated herein by reference.

Figure 3A:
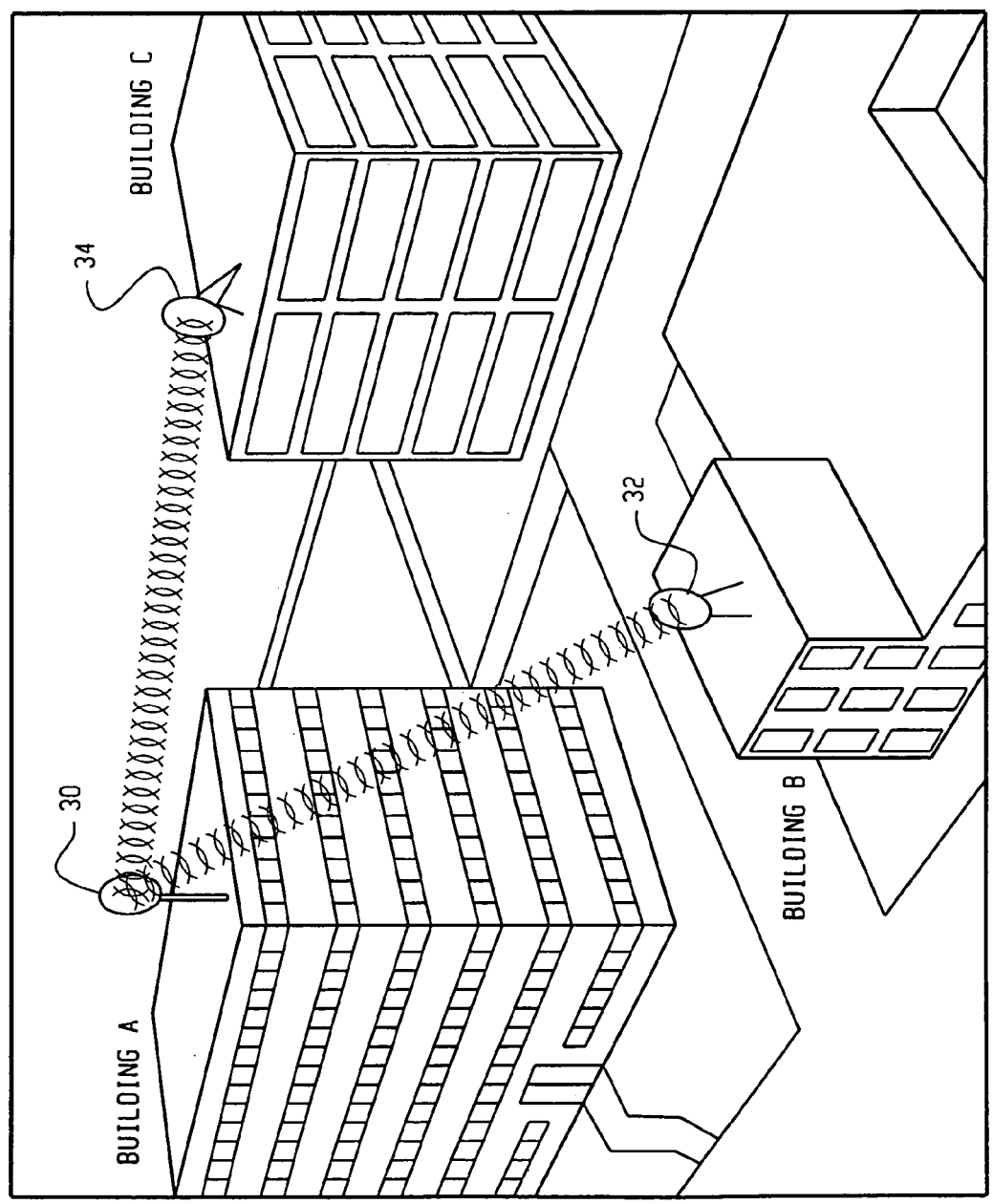
FIG. 3A is an exemplary representation of a building to building configuration of the present invention.
Figure 3B:
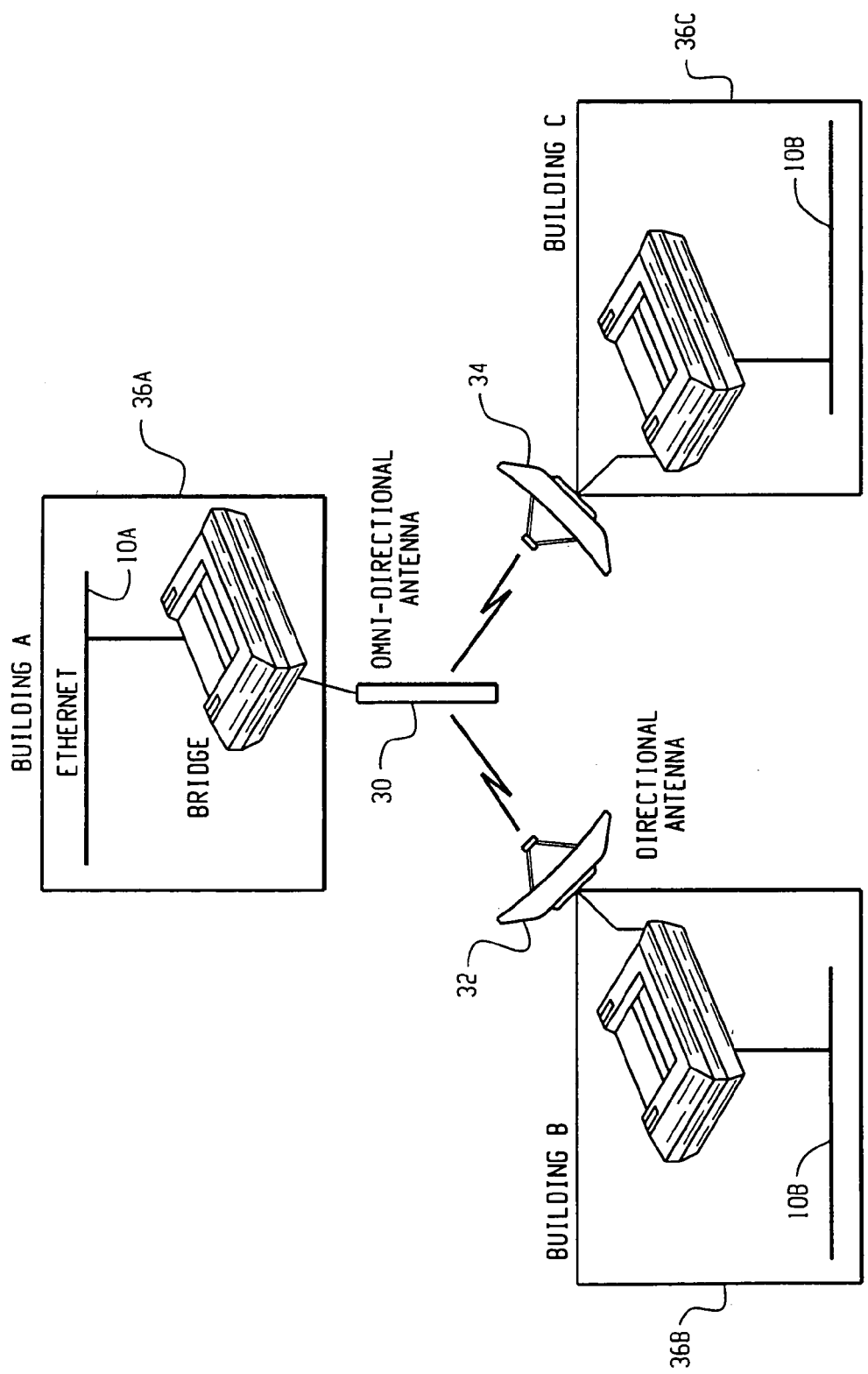
FIG. 3B is an exemplary representation of a building to building configuration of the present invention.
Figure 4:
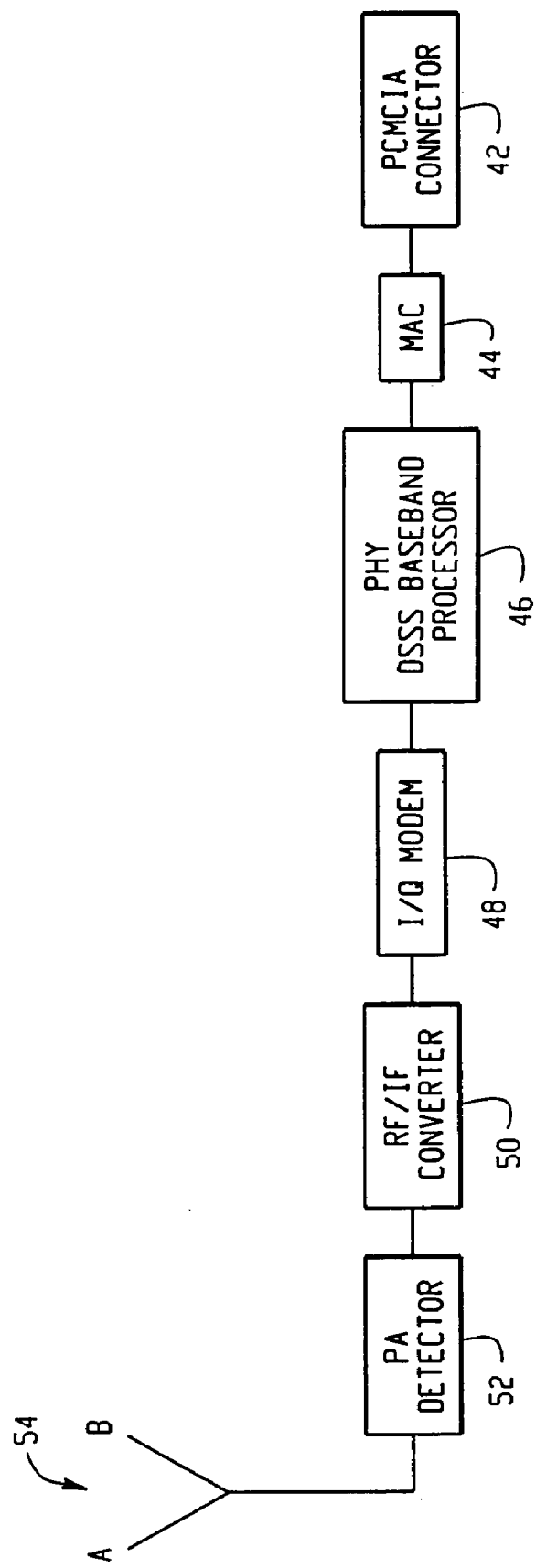
FIG. 4 is a schematic representation of an exemplary embodiment of a typical base station transmitter.

FIG. 3 illustrates another embodiment of the present invention. In FIG. 3 a first base station 30 is located on the roof of a commercial or residential building (Building A). Base stations 32 and 34 transmit and receive data from the base station 30 (located on Buildings B and C, respectively). As shown in FIG. 4, base station 30 comprises an Omni-directional antenna 30 wired to a bridge 36A. The bridge 36A is connected to an Ethernet cable 10A which supports networking throughout the commercial or residential building and permits the occupant of Building A to receive and transmit data to and from Buildings B and C. Directional antennas 32 and 34 are similarly linked to bridges 36B and 36C and the Ethernet cables 10B and C, respectively. Occupants of Buildings B and C are able to transmit and receive data to and from Building A. However, due to the use of directional antennas 32 and 34, occupants of Buildings B and C are not able to communicate directly with each other. In order for such communication to occur, the data must first be sent to Building A and then routed to the appropriate building.

As can be readily appreciated by those of ordinary skill in the art, increasing the effective communication range of the mobile units and the base stations will generally result in less network resources being wasted in establishing communications between base stations. Accordingly, WLAN devices which are capable of increased transmission ranges will generally be more efficient than those WLAN devices having a smaller transmission range. In addition, the increased transmission range may decrease consumer costs associated with WLAN devices because the quantity of base stations to appropriately cover a geographical area may be less than those base stations with a more limited transmission range.

FIG. 4 shows an exemplary embodiment of a wireless radio transmitter. Typically, multiple integrated circuits are combined to implement a data communications radio 40. The primary components of the radio, from the PCMCIA connector 42, are as follows: the media access controller 44, the direct sequence spread spectrum baseband processor or PHY chip 46, the I/Q modulator/demodulator and synthesizer 48, the RF-to-IF converter 50, the power amplifier and detector 52, and the antennas 54A and 54B. One manufacturer that manufactures and sells a corresponding integrated circuit for each of the function blocks listed in FIG. 4 is Intersil Corporation of Mountaintop, Pa. For example, the Intersil PRISM II® chip set consists of the following integrated circuits: the HFA3842 media access controller, the HFA3863 baseband processor, the HFA3783 I/Q Modulator/demodulator, the HFA3683A RF/IF converter, and the HFA3983 power amplifier.

An embodiment of the present invention incorporates certain PRISM II® integrated circuits. However, one of ordinary skill in the art should readily appreciate that the present invention is not limited to the PRISM II® chip set.

Figure 5A:
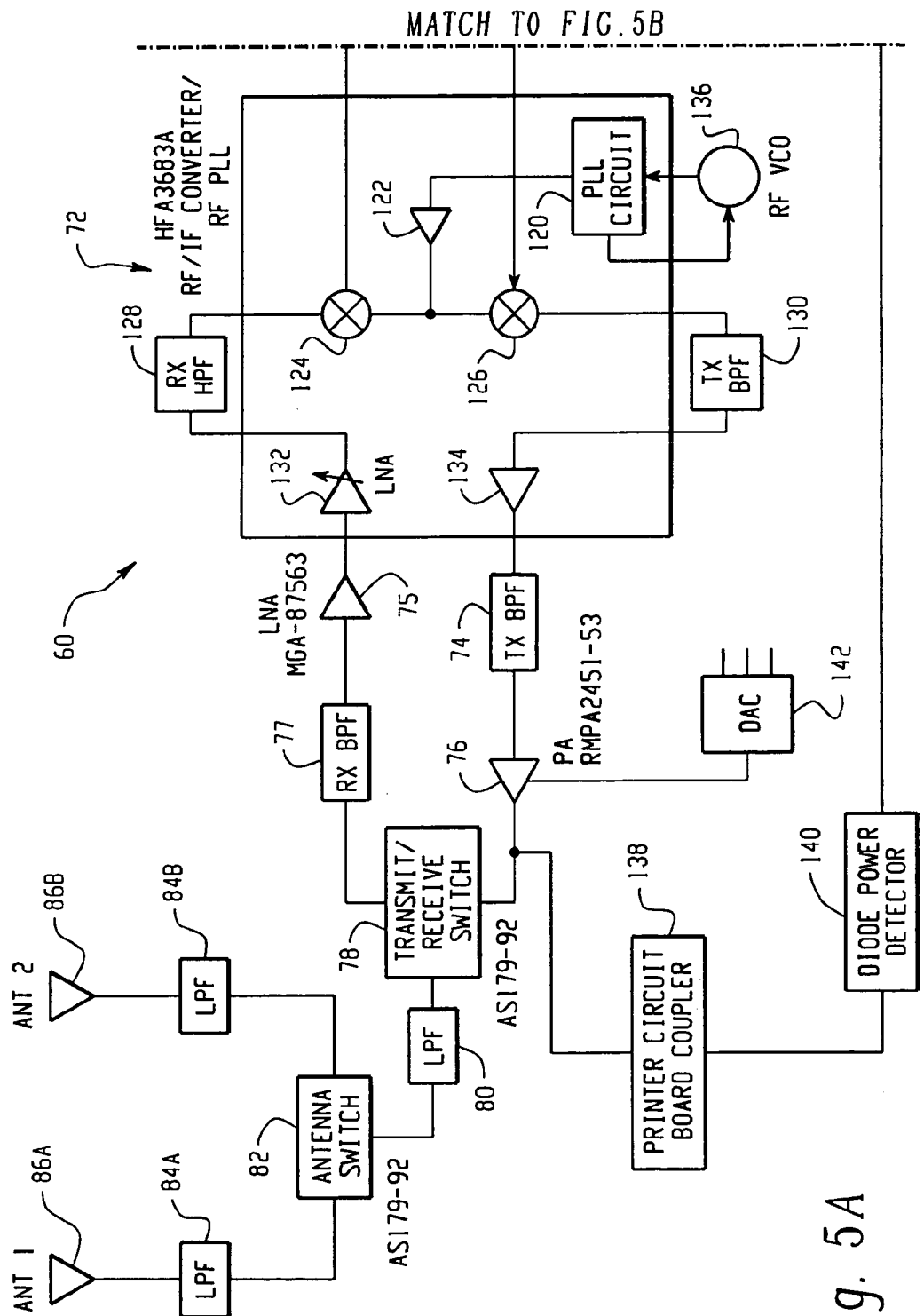
FIG. 5 is a schematic representation of the present invention.
Figure 5B:
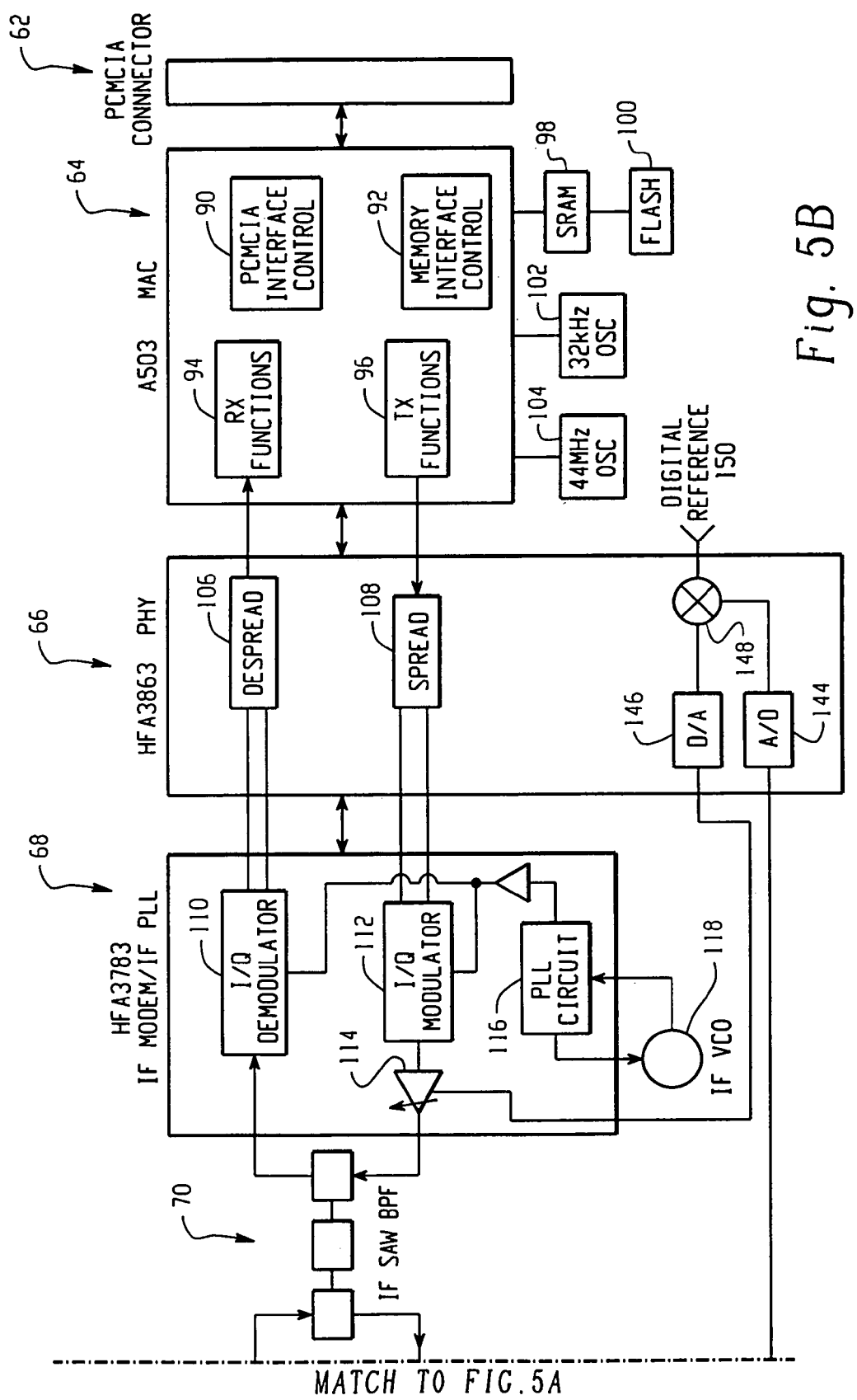

FIG. 5 illustrates an embodiment of the present invention. The general operation of the radio 60 will now be described. On the transmit side, a data signal is received from the PCMCIA connector 62 to the media access controller ("MAC") 64. Presently, the MAC 64 is a media access controller Part No. 08-0458-01, manufactured by Cisco Systems, Inc. of San Jose, Calif. The MAC 64 contains the following functionality: a PCMCIA interface control 90, a memory interface control 92, receive functions 94, and transmit functions 96. In addition, the MAC 64 is linked to a static random access memory 98, a flash memory 100, a 32 kHz oscillator 102 and a 44 MHz oscillator 104.

The signal received from the PCMCIA connector 62 is received by the transmit function block 96 and routed to the baseband processor ("PHY") 66. Presently, the PHY 66 is Part No. HFA3863, manufactured by Intersil of Mountaintop, Pa. The PHY 66 is comprised of two functional blocks, a despread function 106 and a spread function 108 depending on whether the signal is being received or transmitted. The signal routed to the PHY 66 is directed to the spread function 108. The spread function 108 performs a direct sequence spread spectrum operation on the signal. For example, a binary phase shift keyed ("BPSK") operation, complimentary code keyed ("CCK") or a quadrature phase shifted keyed ("QPSK") operation is performed.

Operation of the spread function 108 results in the baseband "I" and "Q" signals being determined for the input data signal. The "I" and "Q" signals are then transmitted to the I/Q MODEM 68. In the present invention, the I/Q modulator/demodulator is Part No. HFA3783, manufactured by Intersil. The I/Q MODEM 68 is composed of the following functional elements: an I/Q demodulator 110, an I/Q modulator 112, a transmit variable gain amplifier 114, and a phase lock loop circuit 116. In addition, the phase lock loop circuit is connected to an external voltage controlled oscillator 118. The "I" and "Q" signals transmitted from the PHY 66 are sent to the I/Q modulator 112 which converts the baseband spread spectrum signal to an intermediate frequency ("IF") of approximately 374 MHz.

The IF signal is then sent to the saw filter 70. The saw filtered signal is then sent to the RF/IF converter 72. Presently, the RF/IF converter 72 is Part No. HFA3683A manufactured by Intersil. The RF/IF converter is composed of the following functional elements: a phase lock loop circuit 120, an oscillator buffer amplifier 122, mixers 124 and 126, a receive high pass filter 128, a transmit bandpass filter 130, a receive variable gain low noise amplifier 132, and a transmit driver amplifier 134. In addition, the phase lock loop circuit 120 is connected to a radio frequency voltage controlled oscillator 136. The signal routed from the saw bandpass filter 70 is sent to the mixer 126 where the signal is mixed (up converted) with an oscillator generated frequency of 2,068 MHz originating from the radio frequency voltage controlled oscillator 136. The resulting signal frequency is approximately 2,450 MHz (or 2.4 GHz) and places the signal to be transmitted in the 2.4–2.483 GHz Industrial Scientific Medical ("ISM") band of the radio spectrum.

The mixed signal is then sent to the transmit bandpass filter 130 and the transmit driver amplifier 134 and exits the RF/IF converter 72. The signal is filtered through bandpass filter 74, amplified by power amplifier 76, routed to the transmit/receive switch 78, filtered through low pass filter 80, through an antenna switch 82, low pass filtered by either filters 84A or 84B and transmitted out the spatially diverse antennas 86A and 86B. Note, FIG. 5 also shows the low noise amplifier 75 and the receive bandpass filter 77. Amplifier 75 and filter 77 are associated with the receive portion of the radio 60.

Presently, the power amplifier 76 is Part No. RMP2451-53 manufactured by Raytheon Semiconductor Co. from Mountain View, Calif. Output from the power amplifier 76 is also directed to the printed circuit board coupler 138 and routed to a diode power detector 140. In the preferred embodiment, the printed circuit board coupler 138 is a printed circuit board microstrip coupler that couples power to the diode power detector 140. In addition, the diode power detector 140 is a zero bias schottky diode. A zero bias schottky diode characteristically has little drift over temperature when operated at high input power levels. Thus, in the preferred embodiment a −17 dB printed circuit board microstrip coupler couples relatively high input power levels to the Schottky diode. This results in a detector transfer function that has only a small amount of drift over a broad temperature range.

From the diode power detector 140, an analog voltage is sent to the PHY 66. The PHY 66 accepts the analog signal, typically in the range of 0–1.5 Volts. The signal is converted by an analog to digital converter 144 and routed to a digital comparison function 148. A digital reference word 150 corresponding to the desired output power is compared to the converted digital signal. Through the transmit automatic gain control function of the PHY 66, a corresponding error signal is produced. The error signal is converted to an analog signal by the digital to analog converter 146 and routed to the variable gain amplifier 114 of the of the I/Q MODEM 68. The error signal effectively provides a digital feedback control loop between the transmitted signal and the next signal to be transmitted, thereby the output power of the radio 60 is effectively held constant. This digital feedback loop enables monitoring of the transmitted signal and the ability to increase or decrease the gain of amplifier 114 in order to output a constant power over a wide range of temperatures.

The power amplifier 76 is a monolithic microwave integrated circuit power amplifier that has a current bias control function. Presently, the bias select of the power amplifier 76 is adjusted by a digital to analog converter 142 to set a desired bias current for each transmit output power. In the present embodiment, the DAC 142 is programmed by a three wire bus and enables adjusting the bias select in 1/256 increments.

The present invention currently supports six predetermined power transmission output levels: 1 mW, 5 mW, 20 mW, 30, mW, 50 mW, and 100 mW. Currently, the digital feedback loop discussed above is available only for the 20 mW and higher transmission powers. One advantage of the power amplifier 76 is that the transmit current drain may be lowered when the radio is transmitting at less than its maximum output range, in this case 100 mW. Thus, at output transmission powers of less than 100 mW, the present invention utilizes DAC 142 to set a lower transmit current drain which lengthens the battery life of the radio 60. For the lower output transmission powers, i.e., 1 mW and 5 mW, the amplifier gains are pre-selected and may be manually altered.

Figure 6A:
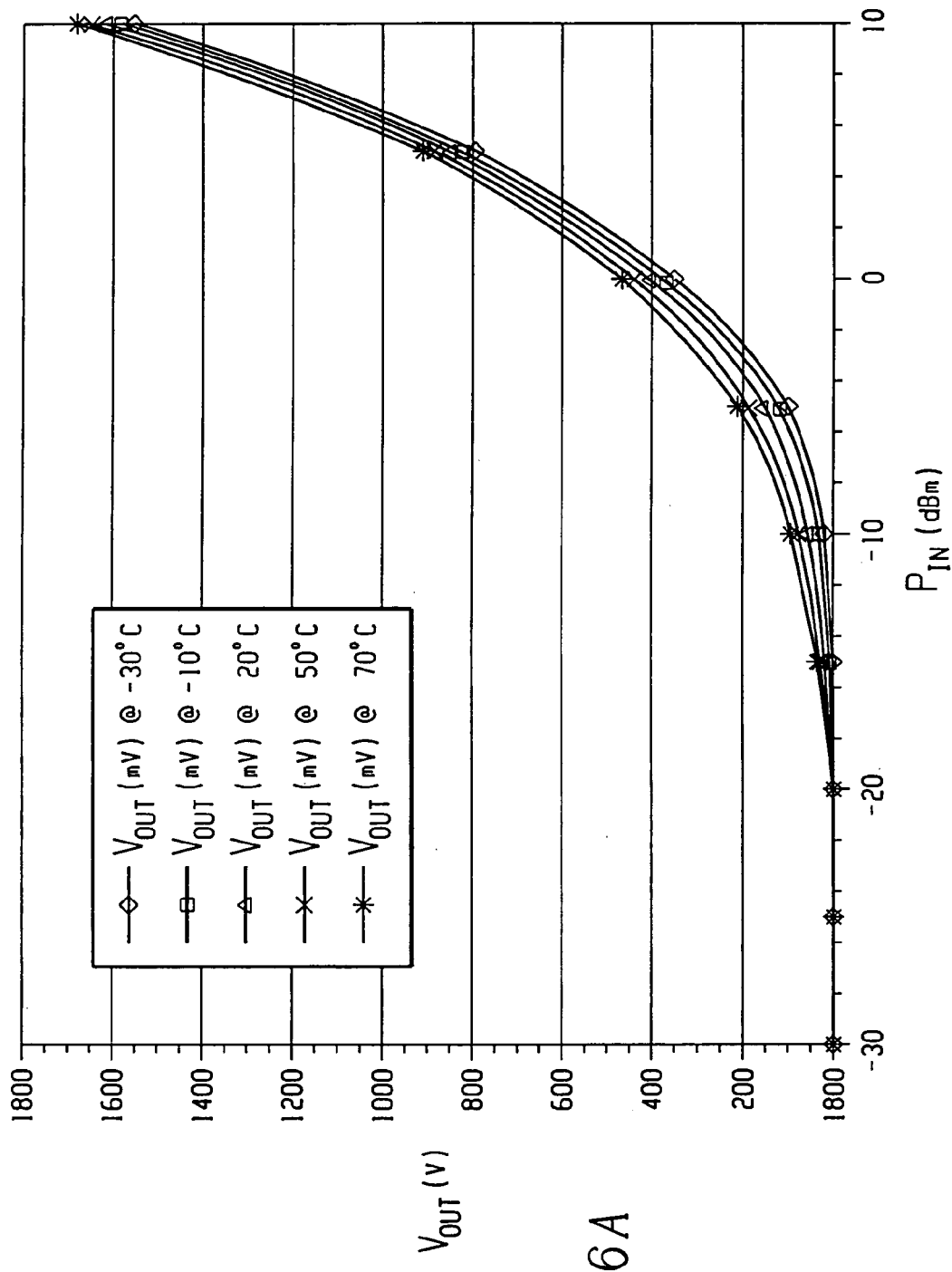
FIGS. 6A–6C graphically illustrate the relationship between the diode detector input power and diode detector output voltage over a range of temperatures.
Figure 6B:
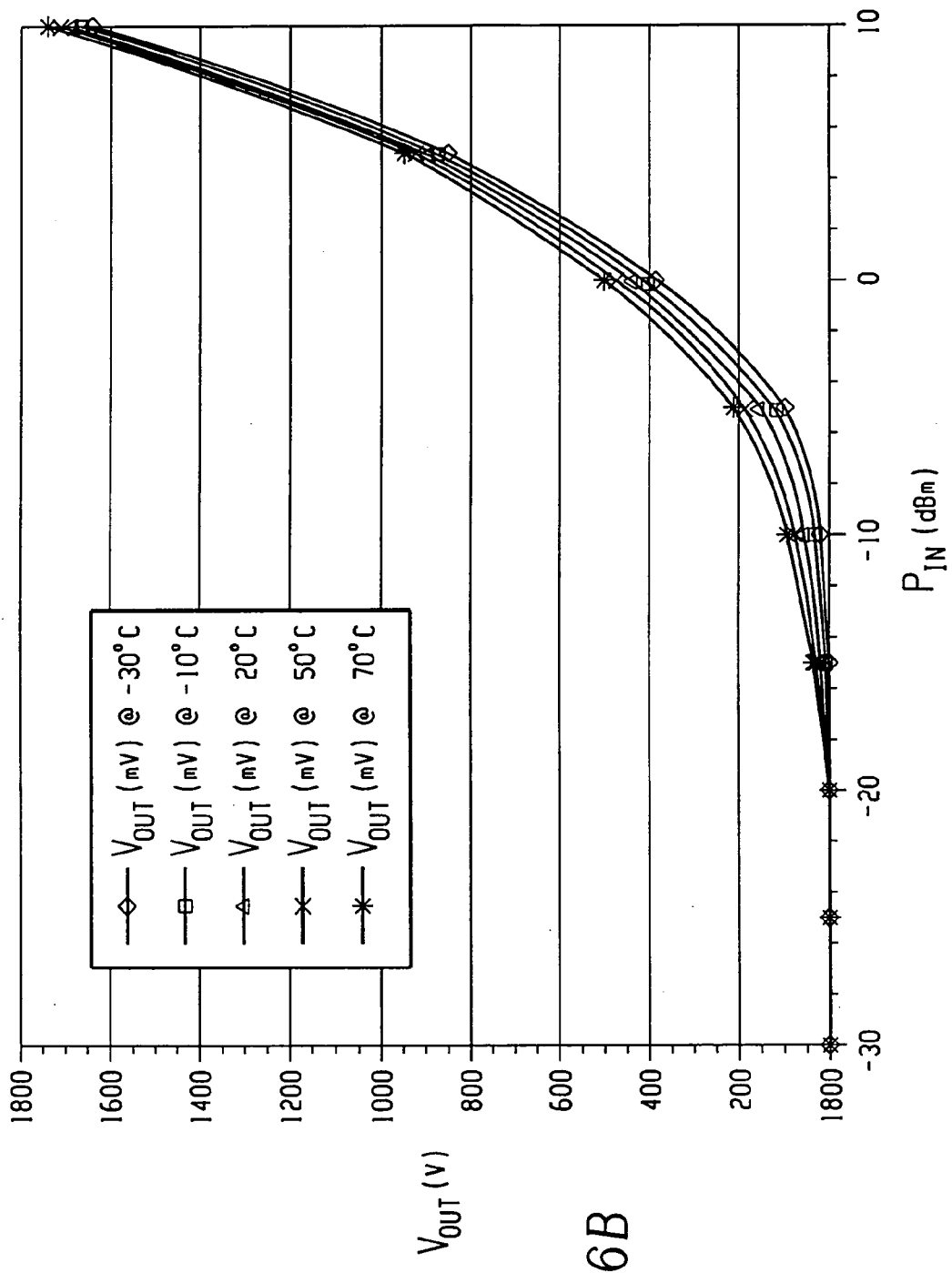
Figure 6C:
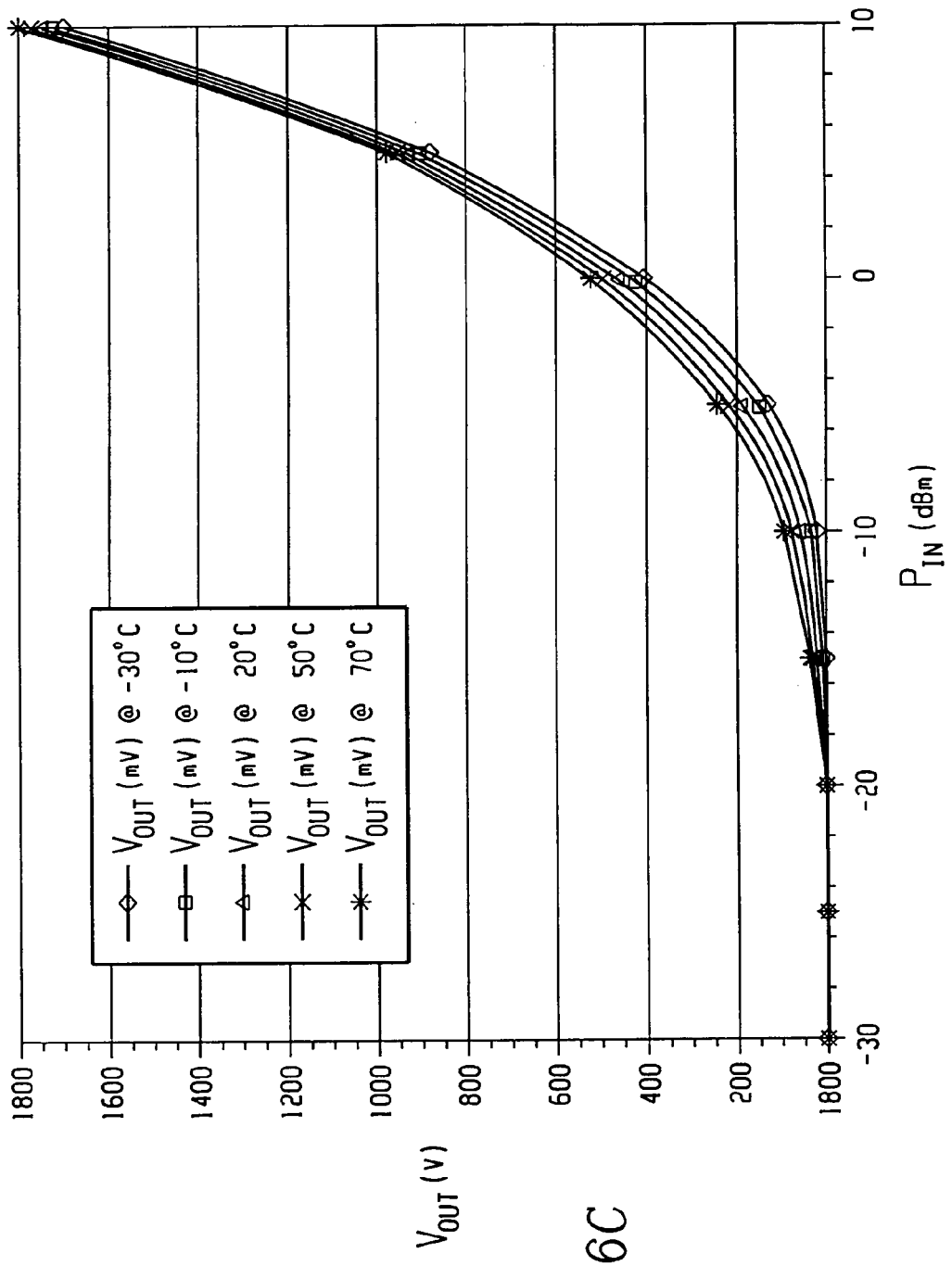

FIGS. 6A–C illustrate typical diode detector input power and output voltage curves at 2400 MHz, 2450 MHz, and 2500 MHz, respectively, while the temperature is varied between −30 degrees C. and 70 degrees C. The term "substantially" as used in the claims to refer to "substantially constant output transmission power over a temperature range" shall be defined with reference to FIGS. 6A–6C.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. An apparatus, comprising:
   a first amplifier having an input, an output and a variable gain adjustment circuit coupled to a signal at a first frequency;
   a circuit for converting the signal from the first frequency to a second frequency coupled to the output of the first amplifier;
   a second amplifier having an input and an output and a bias adjustment circuit, the input of the second amplifier is coupled to the converting circuit for receiving the converted signal at the second frequency; and
   a feedback circuit coupling the output of the second amplifier to the gain adjustment circuit of the first amplifier;
   wherein the variable gain adjustment circuit is operative to adjust the gain of the first amplifier based on a selected power level; and
   wherein the bias adjustment circuit is operative to adjust the bias of the second amplifier based on the selected power level.

2. A circuit according to claim 1, the feedback circuit further comprising a detector.

3. A circuit according to claim 2, the feedback circuit further comprising a −17 dB coupler coupled between the output of the second amplifier and the detector.

4. A circuit according to claim 3, wherein the detector comprises a Schottky diode.

5. A circuit according to claim 2, the feedback circuit further comprising:
an analog to digital converter coupled to the detector;
a digital comparator having first and second inputs, the first input is coupled to the analog to digital converter, the second input receiving a signal representative of a desired power level, the comparator producing an output representative of an error signal corresponding to the difference between signals received on the first and second inputs;
wherein the output of the digital comparator is coupled to the variable gain adjust circuit of the first amplifier, the variable gain adjustment circuit is responsive to the output of the digital comparator to adjust the gain of the first amplifier.

6. An apparatus according to claim 5, further comprising a digital to analog circuit coupled between the output of the digital comparator and the variable gain adjustment circuit.

7. An apparatus according to claim 1, wherein the bias adjustment circuit is a current adjustment circuit.

8. An apparatus according to claim 7, wherein the bias adjustment circuit is operative to adjust current drain of the second amplifier based on the selected power level.

9. A method, comprising:
amplifying a signal at a first frequency by a first amplifier having a variable gain control;
converting the amplified signal to a second frequency;
amplifying the converted signal at the second frequency by a second amplifier having a variable bias;
feeding back the converted, amplified signal from the second amplifier at the second frequency to the variable gain control of the first amplifier;
adjusting the gain of the first amplifier based on a selected power level; and
adjusting the bias of the second amplifier based on the selected power level.

10. A method according to claim 9, further comprising passing the output of the second amplifier through a detector.

11. A method according to claim 10, further comprising passing the output of the detector through a −17 dB coupler.

12. A method according to claim 11, wherein the detector comprises a Schottky diode.

13. A method according to claim 10, the feeding back step further comprising:
converting the signal from the detector to a digital signal;
comparing the converted signal with a signal representative of the selected power level, thereby generating an error signal based on comparing; and
adjusting the gain of the first amplifier based on the error signal.

14. A method according to claim 13, further comprising converting the error signal from a digital signal to an analog signal.

15. An apparatus, comprising:
means for amplifying a signal at a first frequency, the means for amplifying having a means for variable gain control;
means for converting the amplified signal to a second frequency;
means for amplifying the converted signal at the second frequency by a second amplifier, the means for amplifying the converted signal having a variable bias;
means for feeding back the amplified, converted signal from the means for amplifying the converted signal at the second frequency to the means for variable gain control of the means for amplifying a signal at a first frequency;
means for adjusting the gain of the first amplifier based on a selected power level; and
means for adjusting the bias of the second amplifier based on the selected power level.

16. An apparatus according to claim 15, further comprising means for detecting.

17. An apparatus according to claim 16, the means for feeding back step further comprising:
means for converting the signal from the detector to a digital signal;
means for comparing the converted signal with a signal representative of the selected power level, thereby generating an error signal based on comparing; and
means for adjusting the gain of the first amplifier based on the error signal.

18. An apparatus according to claim 17, further comprising means for converting the error signal from a digital signal to an analog signal.

* * * * *